Oct. 22, 1963    F. C. MESSINGER    3,107,446
PORTABLE SNOW REMOVER
Filed Aug. 17, 1962    3 Sheets-Sheet 1
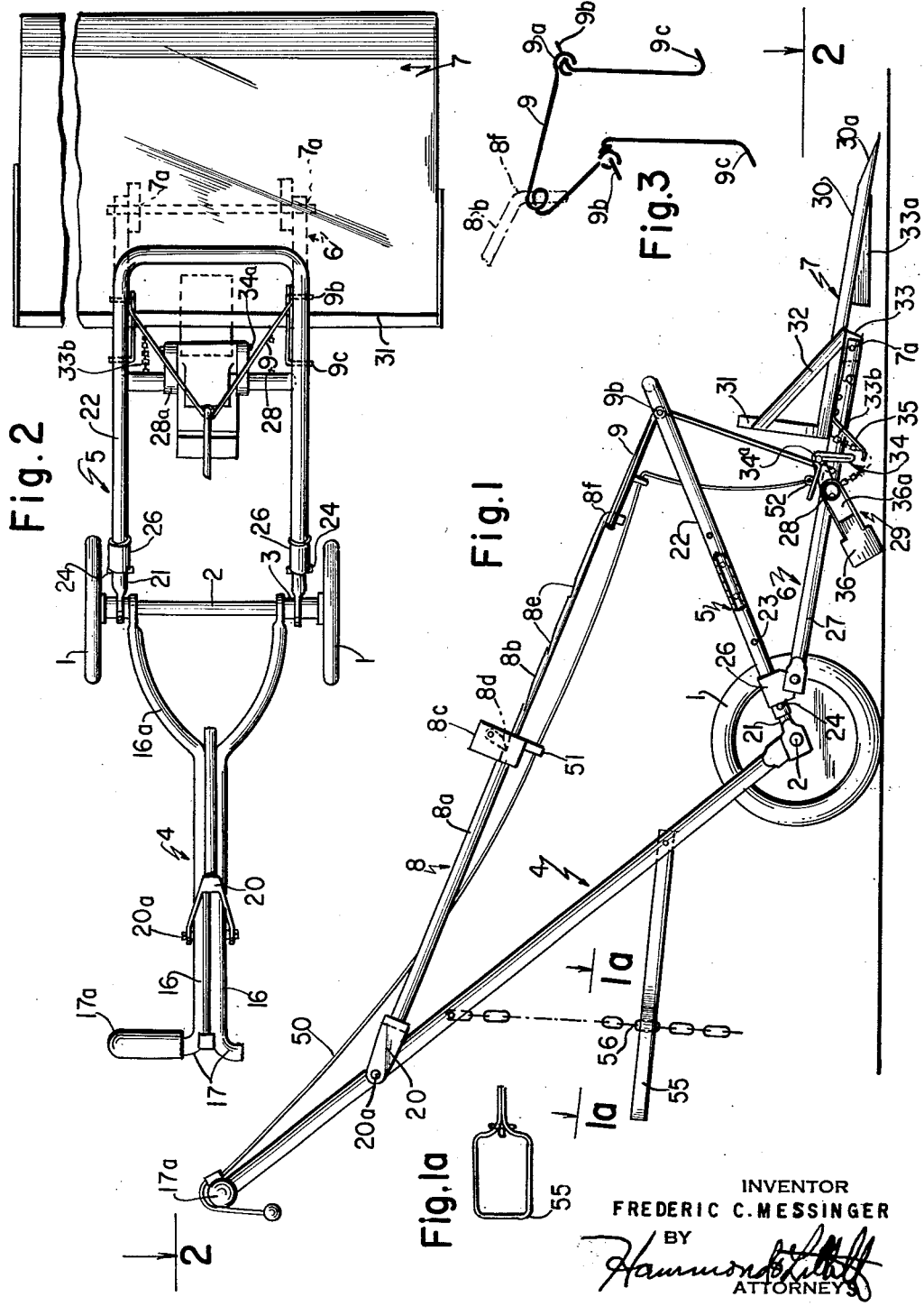
INVENTOR
FREDERIC C. MESSINGER
BY
ATTORNEYS

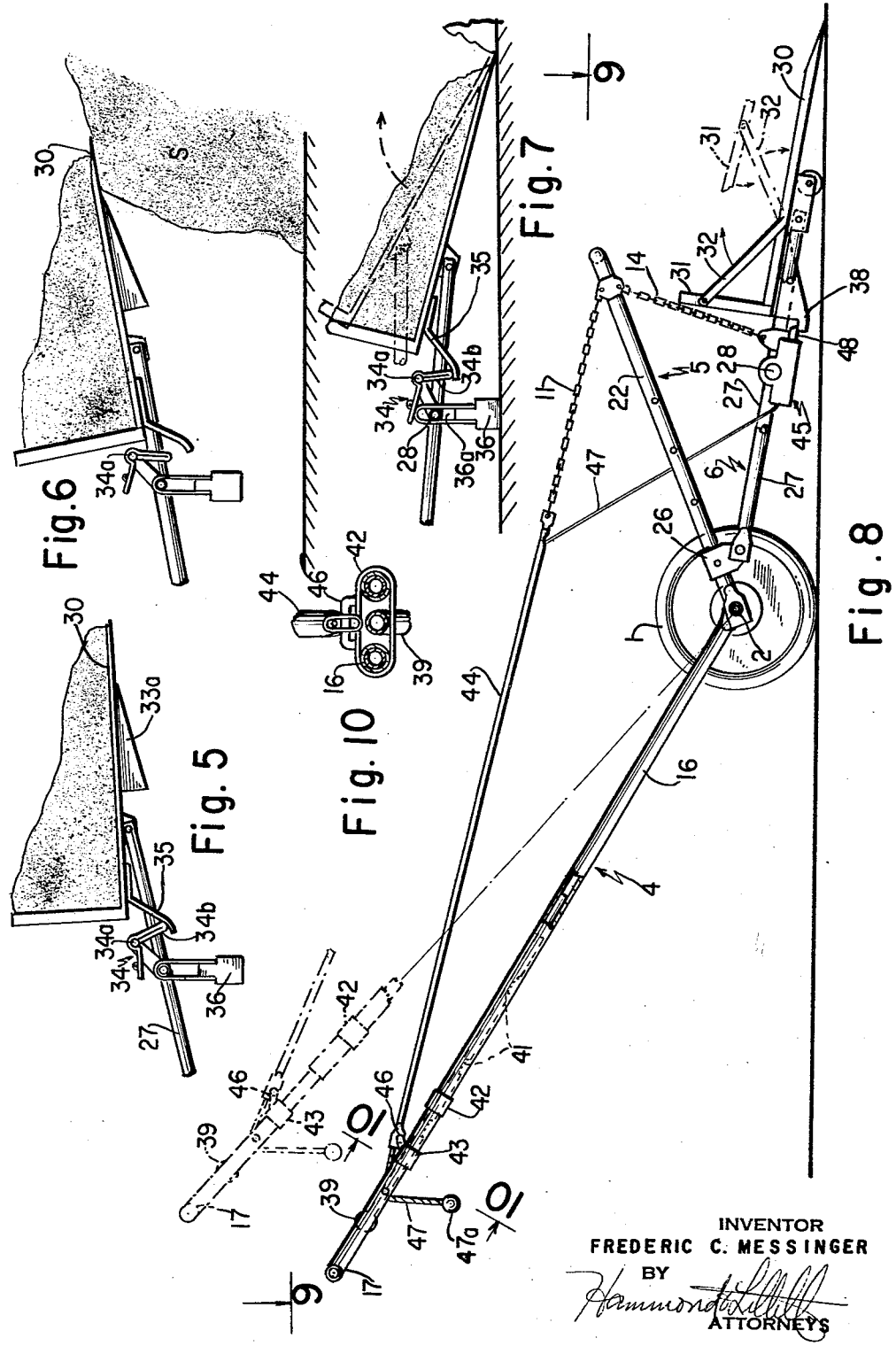

Oct. 22, 1963    F. C. MESSINGER    3,107,446
PORTABLE SNOW REMOVER
Filed Aug. 17, 1962    3 Sheets-Sheet 3
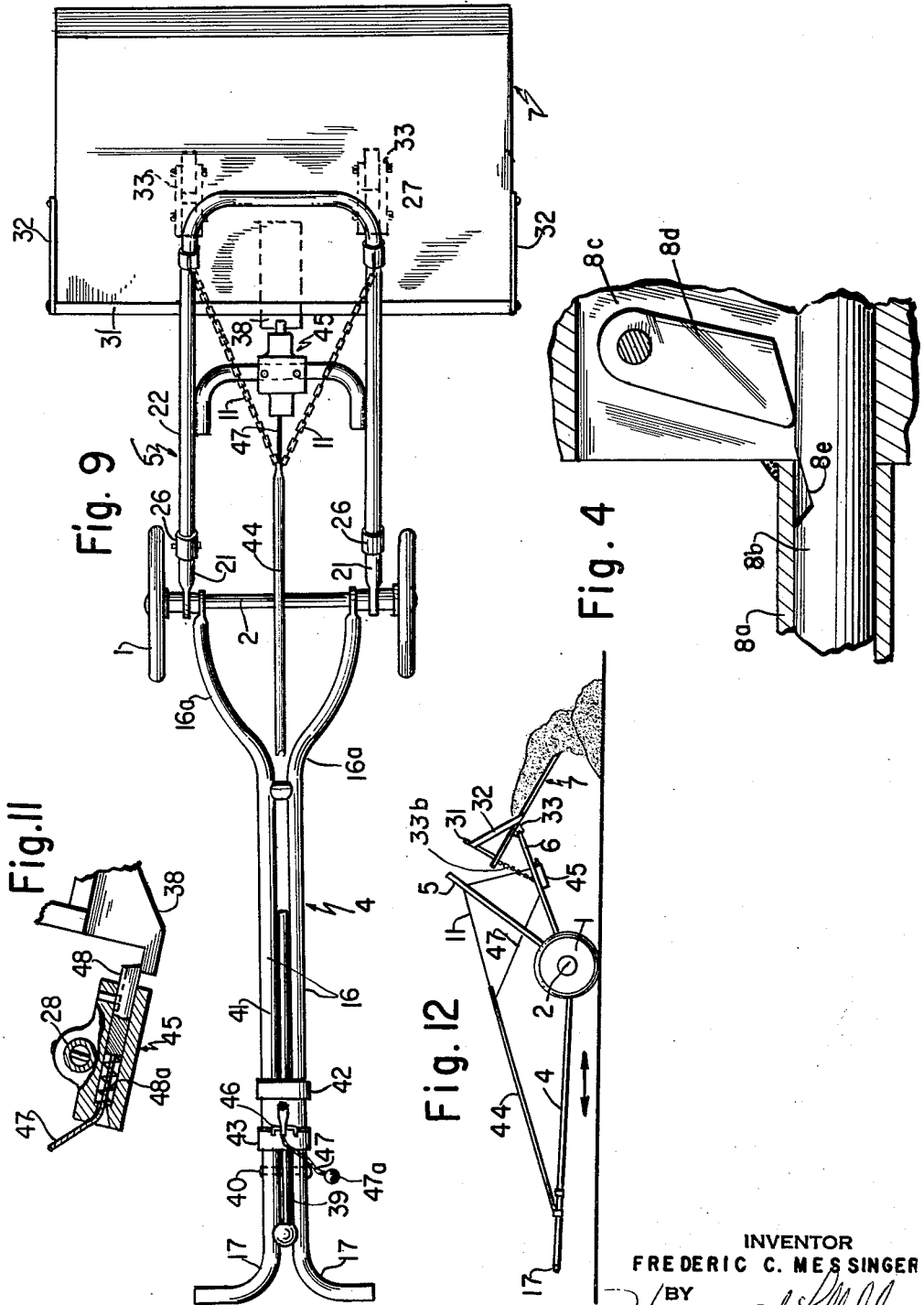
INVENTOR
FREDERIC C. MESSINGER
BY
Hammond Little
ATTORNEYS _United States Patent Office_

3,107,446
Patented Oct. 22, 1963

3,107,446
PORTABLE SNOW REMOVER
Frederic C. Messinger, 3 Alvin Drive, Norwalk, Conn.
Filed Aug. 17, 1962, Ser. No. 217,656
8 Claims. (Cl. 37—130)

This invention relates to a portable shovel or scoop. It more particularly relates to a wheel mounted manually operated shovel which is collapsible when not in use.

My device may be used for the removal of snow or like material. It comprises a scoop hinged on a frame with a handle, the scoop and handle being mounted on wheels. It utilizes leverage, with mobility as one of its features.

The entire frame pivots about the axle and is made up of three main parts, the handle extending in one direction and pivoted on the axle, a yoke, also pivoted on the axle at an angle above the horizontal and extending in a direction away from the handle, and an H frame (or similar structure), mounted on the yoke near the axle and extending below the yoke and in the same direction thereof. The scoop is mounted on the H frame, pivots thereon and is controlled by a suitable latch mechanism. The elements of the frame structure are kept in fixed relationship with one another by flexible tension members, such as rods, cables, chains and the like, extending from the handle, through the yoke to the H frame. Provision is made for adjustment of the angle and length of the yoke, and the position of the H frame on the yoke, so as to vary the pitch of the scoop and its distance from the axle. Because of the construction of the scoop, it is collapsible. In place of the H frame it will be understood that any other frame work pivotally supporting the scoop may be used.

In operation the scoop is pushed under snow for loading. Body weight and leverage are used to elevate the load. The load is wheeled to an unloading spot and when the latch is tripped, the weight of load causes the scoop to tilt and dump the load of snow. The scoop may be automatically re-latched by raising the handle to permit the scoop to snap back into position under its own unbalanced weight ready to pick up another scoopful of snow, or it may be manually re-latched by putting the latch manually into holding position and permitting the scoop to snap into latched position.

My invention is advantageous in that it uses leverage plus body weight to lift snow. It can therefore lift several times more snow in one operation than a shovel and also requires considerably less effort. Since it is mounted on wheels the load can easily be wheeled to any desired location and dumped, thus making it easier to clear wide areas, such as driveways and parking lots. It takes little effort to fill the scoop since the weight of the body makes it easier to push under snow and to lift the snow load.

This device can be used on any reasonable depth of snow, and snow from a wider area can more easily be dumped out of the way than with a hand snow blower or ordinary snow shovel.

The chief advantage of this device over a mechanical plow is the low cost and little maintenance required. Since it is collapsible, it requires little storage space and can be easily transported.

It is therefore an object of my invention to provide a manually operated scoop having mobility and good mechanical advantage.

A further object of my invention is to provide a scoop which is adjustable.

Another object of my invention is to provide a scoop which is collapsible and requires little storage space.

These and other objects of my invention will become apparent as this description proceeds.

The invention may be more clearly understood by reference to the drawings in which:

FIG. 1 is a side elevation of the scoop.

FIG. 1a is a plan view of the foot treadle substantially on the line 1a—1a of FIG. 1, with parts omitted.

FIG. 2 is a top plan view of the scoop of FIG. 1 taken substantially along the line 2—2 of FIG. 1.

FIG. 3 is a perspective view of the bent rod arrangement for connecting the H frame, yoke and handle.

FIG. 4 is a sectional view taken through the handle showing the latch which controls the distance between the handle and the yoke.

FIGS. 5, 6 and 7 illustrate an automatic latch mechanism for the scoop of FIG. 1.

FIG. 8 is a side elevation of an alternate construction of the scoop.

FIG. 9 is a top plan view of the scoop of FIG. 8 taken substantially on the line 9—9 of FIG. 8.

FIG. 10 is a cross-section of the handle taken along the lines 10—10 of FIG. 8.

FIG. 11 shows the latch mechanism for the scoop of FIG. 9.

FIG. 12 shows a side elevation of the scoop operation with the scoop in a released position to dump the shoveled material.

Referring to the drawings in greater detail, in FIGS. 1 and 2, wheels 1, of any suitable type, are mounted on axle 2 and the entire scoop frame, consisting of the handle 4, yoke 5 and H frame 6, pivots about axle 2 on bushings 3. The frame comprises a handle member 4, pivoted on axle 2; a yoke member 5, also pivoted on axle 2; and an H frame 6 (or any suitable similar structure) adjustably mounted on yoke 5. A scoop 7 is pivoted on H frame 6 so that about two-thirds of the length of the scoop 7 is forward of the pivot point 7a to facilitate automatic dumping of the scoop load.

A supporting adjustable suspension means 8, which may be a rod, wire cable, chain or the like, holds yoke 5 at any desired angle with reference to the handle 4. As illustrated in FIGS. 1 and 4, the adjustable suspension means 8 is in the form of a hollow tube 8a pivotally connected to the handle 4 by a yoke 20 and pivot 20a. A notched rod 8b slides telescopically in the hollow tube 8a. A latch housing 8c is connected to the lower end of the tube 8a and a pivoted dog 8d cooperates with the notches 8e in the rod 8b to hold the handle 4 and the yoke 5 in the relative position desired. The dog 8d is so arranged that on rapid movement of the handle 4 forward or rearward, when the scoop 7 is resting on the ground or in snow, the dog 8d will ride over the notches 8e but on slower movement of the handle 4 away from the yoke 5 the dog will drop into the nearest notch and latch the tube 8a and rod 8b firmly in the desired adjusted position. This adjustment is used to adjust the height of the handle 4 to the height of the user and to the weight of the snow being handled and the height to which it must be raised for dumping, and by virtue of the automatic operation of the dog 8d, enables adjustments to be made by movement of the handle 4 alone, so that the user does not have to move to the front of the scoop to make adjustments.

The lower end of rod 8a is bent downward at 8f and removably extends or hooks the rear of a V-shaped flexible rod connector 9 (FIG. 3) which has loops 9a which go around pivot bars 9b extending inward from the sides of yoke 5 and then extend downward to connect at 9c to the sides of H frame 6 at each side thereof. Thus the frame elements, handle 4, yoke 5 and H frame 6 with scoop 7 are held in adjustable relationship by the telescoping members 8a and 8b and V-shaped flexible connectors 9.

The distance between handle 4 and yoke 5 may be adjusted by movement of the rod 8b into and out of tube 8a and the position of the H frame 6 and scoop 7 relative to yoke 5 may be adjusted, as hereinafter described, by movement of the H frame 6 toward or away from the axle 2 by movement of sleeves 26 outward or inward along the sides of yoke 5 and locating the sleeves 26 in the desired position. Movement of the sleeves 26 outward along the sides of yoke 5 raises the relative elevation of scoop 7 when the handle 4 is pressed downwardly and thus permits the scoop to be dumped on a higher pile of snow, for example along the sides of a driveway.

The handle 4 preferably consists of two tubular members 16 secured together at the upper end thereof, and bent into a Y shape 16a at the lower end and pivoted to the axle 2. The hand grip consists of two tubular members 17 bent outwardly from the members 16 at their upper end and hand grips 17a.

The length of yoke 5, as shown in FIGS. 1 and 2, is also adjustable since it is made up of telescoping parts. Yoke 5 is made up of pivot struts 21 which pivot about axle 2 and which are telescopically inserted into U-shaped tubular member 22. Both struts 21 and U-shaped member 22 have perforations 23 into which pins 24 may be inserted for holding the parts in adjusted position. Thus, the yoke may be adjusted for length by sliding the U-shaped member 22 along the struts 21 and locking in the desired position by means of pins 24.

The H frame is slidably and pivotally attached to yoke 5 by means of sleeve brackets 26. Brackets 26 fit closely around and are designed to slide up or down on U-shaped members 22, making it possible to adjust the height of H frame 6 and thus the scoop 7 and also to increase or decrease the spacing of scoop 7 from the axle 2. The weight of scoop 7 suspended from connector rods 9 creates a pressure on brackets 26 so that they are held in the desired position by simple wedging action. The H frame 6 comprises two members 27 which are pivoted on brackets 26 and a cross-bar 28 which may be bolted, welded or the like to members 27 to connect them together. Crossbar 28 serves to strengthen H frame 6. However, it also serves as the pivot bar for a latch mechanism 29 for controlling the dumping of scoop 7. The members 27 project forwardly beyond the connector 28 and at their outer ends scoop 7 is pivoted thereon by pivots 7a.

Scoop 7 is made up of a baseboard 30 edged at 30a to slide under the snow, a folding backboard 31 and suitable bracing elements 32 extending between the baseboard 30 and backboard 31 at each side of the scoop. Scoop 7 is pivotally mounted at the ends of members 27 of H frame 6 by means of pivot brackets 33 located on the lower side of baseboard 30 and pivoted to swing about pivot pins 7a at the ends of members 27. Wedges 33a fastened to the bottom of baseboard 30 facilitates movement of scoop 7 along the ground. Chain 33b connecting the rear of baseboard 30 with the H frame prevents the baseboard from tilting too far in dumping the scoop. The pivot point 7a is located so that about two-thirds of the scoop lies forward of the pivot point. The baseboard and backboard may be of wood, metal or the like as desired. As shown in the dotted line position in FIG. 8, backboard 31 and braces 32 pivot on the baseboard 30 so that the backboard may be folded flat against the baseboard for storage of the scoop.

Latch mechanism 29, as shown on the scoop of FIGS. 1, 2, 5, 6 and 7, operates automatically but may be operated manually as illustrated in FIG. 1. It comprises a latch 34 pivoting on a rod 34a mounted on crossbar 28 of H frame 6 by brackets 28a, and a keeper 35 mounted on the baseboard 30. An automatic tripper 36 is pivoted on cross-bar 28 by means of an elongated slot 36a. In FIGS. 5, 6 and 7 the various positions of the automatic tripper 26 are shown.

The position of the latch 34 and keeper 35 is shown in somewhat exaggerated relation in FIGS. 5, 6 and 7 for better illustration of their operation. In FIG. 5 the latch is shown in its position after loading the scoop with snow. Latch 34 engages keeper 35 holding scoop 7 in fixed position on the H frame 6 in spite of its tendency to tilt. Scoop 7 is moved to the unloading place and lifted as shown in FIG. 6. By lowering the baseboard 30 onto the snow bank S, the keeper 35 is moved away from latch 34 to permit the latch to swing clockwise to unlatch the scoop so that further upward movement of the scoop will cause it to dump its load of snow on the top of snowbank S. To re-latch the scoop, it is lowered to ground level. As indicated in FIG. 7, the keeper 35 is swung past the latchbar 34b of the latch 34 and the bar 34b swings by gravity into position to engage the keeper 35 and latch the scoop in position to slide under and pick up another load of snow, the wings of latch 34 being weighted to swing the latch to the desired position depending upon the elevation of the scoop. To trip the scoop with the tripper 36, the tripper is brought down against the ground or snow pile, the slot 36a permits the top of the tripper to move upwardly into contact with the rear wing of latch 34 to swing the latch clockwise around pivot 34a to disengage wing 34b from keeper 35.

If it is desired to operate the latch 34 manually, a hand operated latch control is mounted on handle 4 (FIG. 1) and operates as follows: a chain or cable 50 extends from between the hand grips 17a through guides 51 to an eye 52 on the upper wing of latch 34. By pulling on the cable 50 the latch 34 may be swung clockwise around pivot 34a to disengage the keeper 35 and by releasing cable 50 the weighting of the latch 34 is such that it will swing counterclockwise around the pivot 34a to thereby engage the keeper 35. The scoop will automatically re-latch itself in loading position when the cable 50 is released and latch 34 is returned to latching position by gravity.

Thus, the scoop comprises a mobile structure wherein the handle may be adjusted in height, the pitch and height of the scoop may be adjusted as desired by the operator and latching and unlatching of the scoop for loading and unloading is automatically or manually controlled.

To enable the weight of the user's body to be used for lifting the loaded scoop, a stirrup 55 (FIGS. 1 and 1a) is pivoted on handle 4 and is adjustable by chain 56 also secured to handle 4. By putting a foot in stirrup 55 and bearing down, the weight of the user's body may be used to elevate the loaded scoop 7.

A further embodiment or modification of my invention is illustrated in FIGS. 8, 9, 10 and 11. This embodiment is essentially similar in structure to that described above except for the handle adjustment, the latch mechanism and the suspension members between the handle and yoke.

In this embodiment, the handle 4 also comprises two members 16 pivoted about axle 2 on wheels 1. Hand grips 17 are slidable telescopically into members 16 (FIG. 10) which are spaced apart. Adjustment rod 39 is pivotally mounted between hand grips 17 by means of pin 40 which passes through grips 17 (see FIGS. 8, 9 and 10). The pivotal movement of rod 39 is only about one or two degrees. Rod 39 extends between members 16. A plurality of notches 41 are provided in the lower side of rod 39 which engage band 42 passing around members 16. The handle length is adjusted by pushing down on the rod 39 which pivots the rod about pin 40 thus disengaging the particular notch 41 from band 42. The hand grips 17 may then be pushed in or pulled out to the length desired. Then rod 39 is allowed to drop into place and the nearest notch 41 is engaged with band 42. A stop band 43 around the hand grips 17 limits the movement of grips 17 into members 16.

In the scoop of FIG. 8, a tubular member 44 replaces the telescoping tube 8a and rod 8b used in the shovel of FIG. 1, although a chain may be used. One reason for this is the use of a manually operated latch mechanism 45 (FIG. 12) to control scoop 7.

Tube 44 is attached to the ends of members 16 by any suitable means, such as ring 46. At the other end of tube 44 suspension members 11 are attached to support yoke 5. Pull cable 47 extends through tube 44. Cable 47 has a handle 47a near grips 17 and connects with scoop latch mechanism 45 at the other end. Latch mechanism 45 is fixed on crossbar 28 and comprises a simple spring-loaded latch 48 (FIG. 11) which engages stop 38 on scoop 7. In FIG. 11, latch 45 is shown in locked position for loading of the scoop. When it is desired to dump the load, cable 47 is pulled by the operator, disengaging latch 48 from catch 38 and permitting scoop 7 to tilt as shown in FIG. 14. When the cable 47 is released, spring 48a returns the latch 48 to latching position and when the forward end of scoop 7 contacts the ground, swinging the scoop counterclockwise around its pivots 7a, scoop 7 returns to its normal position and the latch mechanism again locks it in position for loading.

The entire scoop of FIGS. 1 to 7 or 8 to 11 is collapsible and may be folded nearly flat for more convenient storage. It may be stored flat or hung, for example, on a garage wall. As shown in the dotted lines in FIG. 8, backboard 31 folds down on baseboard 30 of scoop 7 by swinging around pivots on braces 32. In the embodiment of FIGS. 1 to 7, rod 8b is unhooked from the V connector 9 and the handle 4, yoke 5 and H frame 6 and scoop 7 can be folded together and in the embodiment of FIGS. 8 to 11, tube 44 is unhooked from ring 46 and the entire handle is pivoted about axle 2 until it rests on scoop 7, the yoke 5 being simultaneously lowered onto scoop 7. The scoop of FIG. 1 folds in a like manner when the hook 8f is withdrawn from the V-shaped connector 9 and the parts folded together.

Thus, the scoop folds to a nearly flat position for storage and can, for example, be hung on nails on a garage or other storage wall. It will be readily apparent to persons in the art that any suitable structural materials may be used in the construction of my scoop and that it may be modified in various ways and parts omitted without materially interfering with its intended operation.

While I have described preferred embodiments and modes of practice of my invention, this is solely for purposes of illustration and to enable persons skilled in the art to better understand and practice the invention. It will be understood that I do not intend to be limited by the above description and that various changes and modifications may be made in the invention without departing from the spirit of the disclosure or the scope of the appended claims.

I claim:

1. A portable, collapsible mobile scoop, comprising running gear, a handle pivoted on said running gear, a yoke pivoted on said running gear, an H frame mounted on the other side of said yoke from said handle, a scoop pivoted on its underside intermediate the front and back thereof on said H frame, adjustable suspension means for maintaining said handle, yoke and H frame in fixed angular position relative to one another, and latch means for locking and releasing said scoop.

2. A portable, collapsible mobile scoop, comprising running gear consisting of wheels and an axle, a handle pivoted on said axle, a yoke pivoted on said axle, an H frame mounted on said yoke, a scoop pivoted on its underside intermediate the front and back thereof on said H frame, adjustable suspension means for maintaining said handle, yoke and H frame in fixed angular relation relative to one another about said axle, and latch means for locking and releasing said scoop.

3. A portable, collapsible mobile scoop, comprising running gear consisting of wheels and an axle, a handle pivoted on said running gear, an adjustable yoke pivoted on said running gear, a scoop supporting frame mounted on said yoke, a scoop pivoted on said frame about one third the distance from the back to the front of said scoop, adjustable suspension means for maintaining said handle, yoke and frame in fixed angular relation relative to one another about said axle, and latch means for locking and releasing said scoop.

4. A portable, collapsible mobile scoop, comprising running gear, a handle pivoted on said running gear, an axle, a yoke pivoted on said running gear, a scoop supporting structure pivotally and slidably mounted on said yoke, a scoop pivoted on said scoop supporting structure, adjustable suspension means for maintaining a desired angular relationship between said handle, yoke and scoop supporting structure fixed relative to one another about said axle, and latch means for locking and releasing said scoop.

5. A portable, collapsible scoop, comprising running gear consisting of wheels and an axle, an adjustable handle pivoted on said axle, an adjustable yoke pivoted on said axle, an H frame pivotally and slidably mounted on said yoke, for movement toward and away from said axle, a scoop pivoted on said H frame, adjustable suspension means for maintaining said handle, yoke and H frame in fixed angular relation to one another comprising an adjustable telescoping tube and rod between said handle and said yoke and means to hold said telescoping tube and rod in the desired position of adjustment and latch means for locking and releasing said scoop.

6. A portable, collapsible mobile scoop, comprising running gear consisting of wheels and an axle, a handle pivoted on said axle, a yoke pivoted on said axle, an H frame mounted on said yoke, a scoop pivoted on its underside on said H frame, about one third the distance from the rear to the front of said scoop, suspension means for maintaining said handle, yoke and H frame in fixed angular relation relative to one another about said axle, and latch means for automatically locking and releasing said scoop and manually controlled means for releasing said latch means.

7. The scoop of claim 6 wherein the automatic latch means comprises a lock bar pivoting on the cross bar of said H frame, a stop on the rear of said scoop which is held by said lock bar, an arm pivoting on said lock bar at a point past the pivot of said lock bar on said cross bar from said stop, and an elongated slot in said arm at the pivot point.

8. A portable, collapsible mobile scoop, comprising running gear consisting of wheels and an axle, a telescopically adjustable handle pivoted on said axle, a telescopically adjustable yoke pivoted on said axle, an H frame pivotally and slidably mounted on said yoke, a scoop pivoted on said H frame, adjustable suspension means for maintaining said handle, yoke and H frame fixed relative to one another about said axle, and latch means for locking and releasing said scoop.

References Cited in the file of this patent

UNITED STATES PATENTS

| | | |
|---|---|---|
| 2,582,435 | Howard | Jan. 15, 1952 |
| 2,638,236 | Prowinsky | May 12, 1953 |
| 2,845,278 | Breeler | July 29, 1958 |
| 2,930,152 | Pipkin | Mar. 29, 1960 |
| 3,028,695 | Westby | Apr. 10, 1962 |